United States Patent
Imaeda et al.

(10) Patent No.: US 8,646,583 B2
(45) Date of Patent: Feb. 11, 2014

(54) DUST BOOT

(75) Inventors: Hisato Imaeda, Tokyo (JP); Masaru Fukushima, Tokyo (JP); Kazuhiko Hayashi, Yokohama (JP)

(73) Assignees: Kayaba Industry Co., Ltd., Tokyo (JP); Bridgestone Corporation, Tokyo (JP)

( * ) Notice: Subject to any disclaimer, the term of this patent is extended or adjusted under 35 U.S.C. 154(b) by 1126 days.

(21) Appl. No.: 11/673,315

(22) Filed: Feb. 9, 2007

(65) Prior Publication Data

US 2007/0187197 A1 Aug. 16, 2007

(30) Foreign Application Priority Data

Feb. 13, 2006 (JP) .................................. 2006-35170

(51) Int. Cl.
*F16D 55/18* (2006.01)

(52) U.S. Cl.
USPC .................. 188/72.4; 188/322.12; 188/218 A; 267/64.27

(58) Field of Classification Search
USPC ............. 188/322.12, 72.4, 218 A; 267/64.27, 267/64.19, 64.21, 64.23, 64.24
See application file for complete search history.

(56) References Cited

U.S. PATENT DOCUMENTS

| | | | | |
|---|---|---|---|---|
| 4,969,542 A | * | 11/1990 | Athmer et al. ............ | 188/322.12 |
| 5,308,091 A | * | 5/1994 | Mihalcin ........................ | 277/636 |
| 5,402,868 A | * | 4/1995 | Handke et al. ............ | 188/322.12 |
| 5,467,971 A | * | 11/1995 | Hurtubise et al. ............. | 267/220 |
| 5,676,355 A | * | 10/1997 | Hayashi et al. ................ | 267/221 |
| 5,954,168 A | * | 9/1999 | Nakatani et al. .......... | 188/322.12 |
| 6,042,092 A | * | 3/2000 | Shibata .......................... | 267/122 |
| 6,401,858 B1 | * | 6/2002 | Saito et al. ..................... | 180/428 |
| 7,077,248 B2 | * | 7/2006 | Handke et al. ............ | 188/321.11 |
| 7,090,058 B2 | * | 8/2006 | Miyazaki et al. ......... | 188/322.12 |
| 7,530,575 B2 | * | 5/2009 | Ota ................................. | 277/635 |
| 2002/0185825 A1 | * | 12/2002 | Miyamoto et al. ............. | 277/636 |
| 2003/0209395 A1 | * | 11/2003 | Fukaya ..................... | 188/322.12 |
| 2004/0168871 A1 | * | 9/2004 | Handke et al. ............ | 188/322.12 |
| 2005/0121860 A1 | * | 6/2005 | Ota ................................. | 277/635 |

FOREIGN PATENT DOCUMENTS

JP 10-213223 8/1998

* cited by examiner

*Primary Examiner* — Robert A Siconolfi
*Assistant Examiner* — James Hsiao
(74) *Attorney, Agent, or Firm* — Rabin & Berdo, P.C.

(57) ABSTRACT

A bellows (2) of a dust boot (1, 30) having large diameter parts (3) and small diameter parts (4) disposed alternately covers a piston rod (R) projecting from a cylinder (C). A bump stopper (B) fixed to the cylinder (C) projects into the bellows (2) as a projecting portion. The bellows (2) comprises a first section (M) which passes a projecting end of the projecting portion according to the elongation and contraction of the piston rod (R) and a second section (L) located therebelow. By making the small diameter parts in the second section (L) have a smaller inner diameter than the small diameter part located at a boundary between the first section (M) and the second section (L), the bellows (2) can be made slim without interfering with the bump stopper (B).

12 Claims, 4 Drawing Sheets

DUST BOOT

FIELD OF THE INVENTION

This invention relates to the structure of a dust boot which covers the exposed area of a piston rod projecting from a cylinder of a shock absorber or the like.

BACKGROUND OF THE INVENTION

A hydraulic shock absorber installed between a sprung member and an unsprung member of a vehicle is always exposed to ambient air, and hence dust and mud may accumulate on a piston rod projecting from a cylinder of the shock absorber. The dust and mud adhered to the piston rod adversely affect the lubrication of a sliding part between the piston rod and the cylinder, and cause a seal member sealing the sliding part to deteriorate.

In this context, JPH10-213223A published by the Japan Patent Office in 1998, proposes a cylindrical dust boot using a bellows in order to cover the piston rod projecting from the cylinder.

In this prior art, an end of the dust boot is connected to the projecting end of the piston rod. Another end of the dust boot is connected to an intermediate portion of the cylinder. The length of the bellows is set larger than a projecting length of the piston rod when it is elongated to a maximum elongated position.

According to the above construction, the bellows elongates and contracts according to the elongation/contraction of the piston rod, and the piston rod projecting from the cylinder is always shielded by the bellows from the dust and mud.

SUMMARY OF THE INVENTION

When the shock absorber is installed inside a suspension spring which is disposed between the sprung member and the unsprung member of a vehicle, the installation space of the dust boot is limited, and hence it is preferable that the outer diameter of the dust boot be small.

According to this prior art, the dust boot covers a part of the cylinder, and hence if the outer diameter of the dust boot is decreased, the dust boot may interfere with the cylinder when the shock absorber contracts, and the inner surface of the dust boot is apt to become worn. In this prior art, therefore, decreasing the diameter of the dust boot adversely affects the durability of the dust boot.

It is therefore an object of this invention to make the dust boot slim without adversely affecting the durability thereof.

In order to achieve the above object, this invention provides a dust boot covering at least a part of a piston rod projecting from a cylinder or a cylinder fixed member.

The dust boot comprises a substantially cylindrical bellows formed by small diameter parts and large diameter parts disposed alternately, and an end of the bellows is supported by a support on the outside of the cylinder. The cylinder or a member fixed to the cylinder comprises a projecting portion projecting into the bellows. The bellows is divided into a several sections including a first section which passes a projecting end of the projecting portion when the piston rod elongates and contracts with respect to the cylinder, and a second section located between the first section and the support.

The inner diameter of small diameter parts in the second section is set to be smaller than the inner diameter of the small diameter part located at a boundary between the first section and the second section.

The details as well as other features and advantages of this invention are set forth in the remainder of the specification and are shown in the accompanying drawings.

DESCRIPTION OF THE PREFERRED EMBODIMENTS

Figure 1:
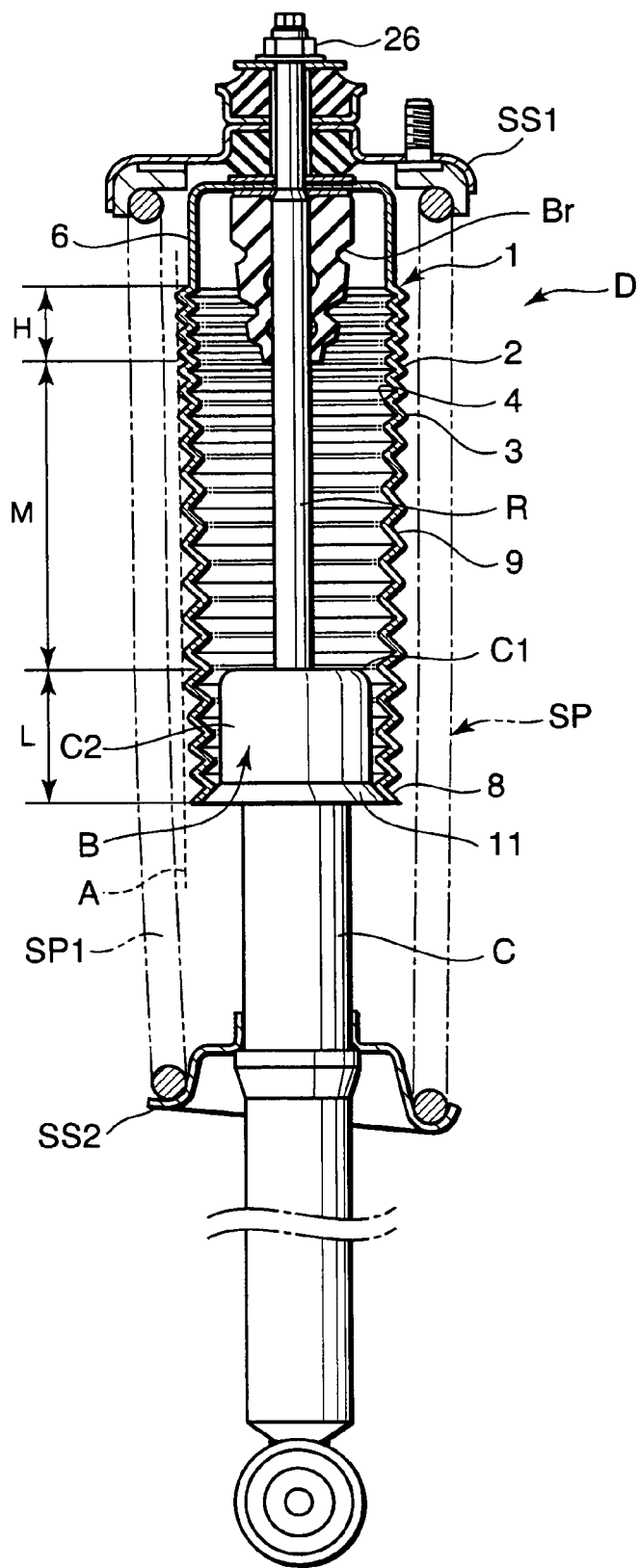
FIG. 1 is a longitudinal sectional view of a hydraulic shock absorber in a maximum elongated position, provided with a dust boot according to this invention.

Referring to FIG. 1 of the drawings, a hydraulic shock absorber D comprises a cylinder C and a piston rod R projecting upward from the cylinder C. A bump stopper B is fitted to the upper end of the cylinder C, from which the piston rod R projects. A rubber cushion Br is fitted on the outer circumference of the projecting end of the piston rod R. The rubber cushion Br prevents the piston rod R from contracting beyond a maximum contracted position by abutting against the bump stopper B.

A sliding portion of the piston rod R projecting from the cylinder C is covered by a dust boot 1. The dust boot 1 is made of a resilient material and comprises a cylindrical part 6 with a bottom and a bellows 2 extending downward from the cylindrical part 6. The dust boot 1 is fitted to the hydraulic shock absorber D so as to cover the rubber cushion Br, the sliding portion of the piston rod R, and the bump stopper B, in a state where the bottom of the cylindrical part 6 faces upward.

The cylinder C comprises two operation chambers partitioned by a piston connected to the piston rod R. The operation chambers are filled with hydraulic fluid. The cylinder C further comprises a gas chamber in order to compensate for the penetration volume of the piston rod R into the cylinder C. The piston rod R projects upward from the upper end of the cylinder C while sliding on a bearing and a seal member. The above described sliding portion of the piston rod R denotes a portion of the piston rod R which slides on the bearing and the seal member of the cylinder C according to the elongation/contraction of the piston rod R with respect to the cylinder C.

The hydraulic shock absorber D generates a damping force against the elongation/contraction of the piston rod R by exerting hydraulic resistance against the displacement of the piston. Since a mechanism to realize such a shock absorbing function is well known to those skilled in the art, further description of the damping force generating mechanism of the shock absorber D is herein omitted.

Figure 2:
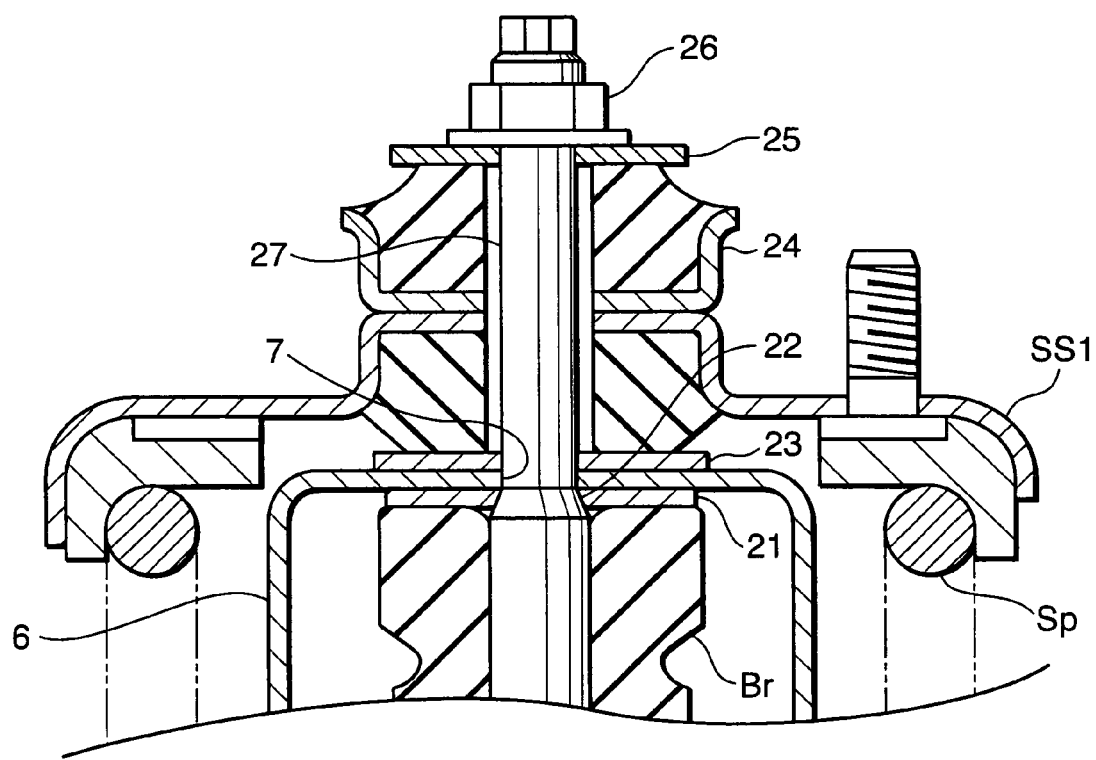
FIG. 2 is an enlarged view of a projecting end of a piston rod of the hydraulic shock absorber.

Referring to FIG. 2, a decreased diameter part 27 having a smaller diameter than the other part is formed in the piston rod R in the vicinity of the projecting end thereof via a tapered portion 22.

The rubber cushion Br is elastically fitted onto the outer circumference of the piston rod R under a washer 21 which is seated on the tapered portion 22. The decreased diameter part 27 of the piston rod R penetrates upward through a through hole 7 formed in the bottom of the cylindrical part 6 of the dust boot 1. The decreased diameter part 27 of the piston rod R further penetrates a washer 23, an upper spring seat SS1, a spacer 24, and a washer 25. The dust boot 1 and the upper spring seat SS1 are fixed to the decreased diameter part 27 of the piston rod R by securing a nut 26 onto a tip of the decreased diameter part 27.

Referring again to FIG. 1, a lower spring seat SS2 is fixed onto the outer circumference of the middle of the cylinder C. A suspension spring SP is interposed between the upper spring seat SS1 and the lower spring seat SS2. The suspension spring SP is a coil spring and is disposed to surround the dust boot 1.

Figure 3:
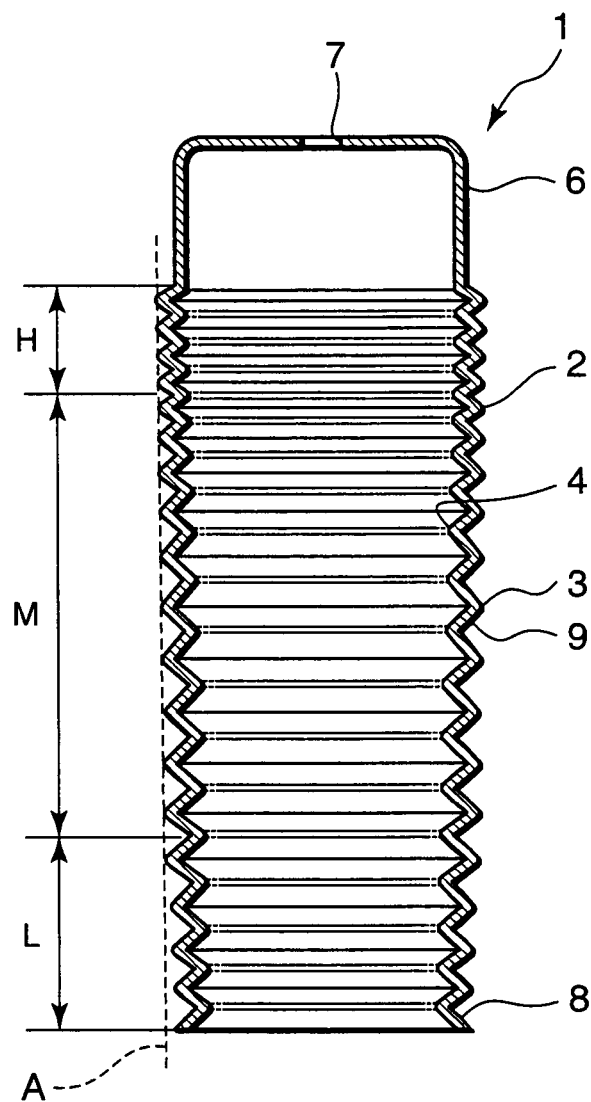
FIG. 3 is an enlarged view of the dust boot in FIG. 1.

Referring to FIG. 3, the bellows 2 of the dust boot 1 comprises a number of large diameter parts 3 and small diameter parts 4 which are disposed alternately via a tapered face 9. A lower end 8 of the bellows 2 is supported by a support 11 which is formed in the lower end of the bump stopper B. The support 11 is formed in a conical shape which matches the tapered face 9 forming the lower end of the bellows 2. This tapered face 9 connects the lowermost small diameter part 4 with the lowermost large diameter part 3 located therebelow. The conical shape of the support 11 and the tapered face 9 forming the lower end of the bellows 2 are arranged to have equal taper angles.

Referring again to FIG. 1, the dust boot 1 has an axial length which prevents the lower end 8 of the bellows 2 from being detached from the support 11 even when the piston rod R is elongated to the maximum elongated position.

As a result, the sliding portion of the piston rod R projecting from the cylinder C is always covered by the dust boot 1 without being exposed to the exterior of the dust boot 1, irrespective of the elongation/contraction position of the piston rod R.

According also to the above construction of the dust boot 1, the entire bump stopper B forms a projecting portion which projects into the dust boot 1.

Next, the construction of the bellows 2 will be described.

The bellows 2 can be divided into a first section M, a second section L, and a third section H. It should be noted that FIG. 1 shows the hydraulic shock absorber D in the maximum elongated position. The first section M, the second section L, and the third section H are defined with respect to the maximum elongated position of the piston rod R. FIG. 3 does not show a free state of the dust boot 1, but shows an enlarged view of the dust boot 1 in FIG. 1. The lengths of the first section M, the second section L, and the third section H in FIG. 3 are therefore identical to those indicated in FIG. 1.

The first section M denotes a portion of the bellows 2 which passes an upper end face C1 of the projecting portion and may come into contact therewith when the piston rod R strokes fully from the maximum elongated position to the maximum contracted position. The second section L is a section located below the first section M. The bellows 2 in the second section L always faces a side face C2 of the projecting portion which extends downward from the rim of the upper end face C1, irrespective of the elongation/contraction position of the piston rod R. The third section H is located above the section M. The bellows 2 in the third section H always stays above the upper end face C1 of the projecting portion, irrespective of the elongation/contraction position of the piston rod R. Accordingly, only the bellows 2 in the first section M may come into contact with the rim of the upper end face C1 when the piston rod R contracts from the maximum elongated position to the maximum contracted position.

Herein, the upper end face C1 denotes the upper end face of the bump stopper B fixed to the upper end of the cylinder C. The side face C2 denotes the outer circumferential face of the bump stopper B. When a member other than the bump stopper B is fixed to the upper end of the cylinder C, the upper end face of this member is regarded as the upper end face C1 and the side face of this member is regarded as the side face C2.

Further, in a shock absorber in which the bump stopper B is not provided and the cylinder C directly projects into the dust boot 1, the upper end of the cylinder C is regarded as the upper end face C1 and the outer circumferential face of the cylinder 2 exposed to the interior of the dust boot 1 is regarded as the side face C2 of the projecting portion.

With respect to the bellows 2 in the first section M, the inner diameter of the small diameter parts 4 is set to be amply larger than the outer diameter of the upper end face C1 or the outer diameter of the bump stopper B such that the small diameter parts 4 in the first section M do not interfere with the rim of the upper end face C1 when the piston rod R contracts from the maximum elongated position towards the maximum contracted position as in the case of the prior art.

Since there is no fear that the small diameter parts 4 of the bellows 2 in the second section L will come in contact with the rim of the upper end face C1 of the projecting portion, the inner diameter of the small diameter parts 4 of the bellows 2 in the second section L is set to be smaller than the inner diameter of the small diameter parts 4 in the first section M while being slightly greater than the outer diameter of the side face C2.

Specifically, the diameter of the lowermost small diameter part 4 in the second section L, or in other words the diameter of the small diameter part 4 adjacent to the lower end 8 of the bellows B is set to be slightly greater than the outer diameter of the side face C2, and the inner diameter of the other small diameter parts 4 in the second section L is increased towards the boundary between the second section L and the first section M. It should be noted however that the variation in the inner diameter of the small diameter parts 4 in the second section L is not necessarily constant. It is also possible to divide the second section L into several groups of consecutive small diameter parts 4 and arrange these small diameter parts 4 such that the inner diameter of the small diameter parts 4 within a single group is constant while being different to the inner diameter of the small diameter parts 4 in an adjacent group.

Further, with respect to the bellows 2 in the first section M, the inner diameter of the small diameter parts 4 is gradually increased upward. It should be noted however that the variation in the inner diameter of the small diameter parts 4 in the first section M is not necessarily constant. It is also possible to divide the first section M into several groups of consecutive small diameter parts 4 and arrange these small diameter parts 4 such that the inner diameter of the small diameter parts 4 within a single group is constant while being different to the inner diameter of the small diameter parts 4 in an adjacent group.

With respect to the bellows 2 in the third section H, there is no specific restriction on the inner diameter of the small diameter parts 4.

According to the above settings, the inner diameter of the small diameter parts 4 in the second section L is smaller than the inner diameter of the small diameter part 4 located at the boundary between the first section M and the second section L.

The length of the first section M is determined according to the specifications of the shock absorber D including, for example, the presence or absence of the bump stopper B and the rubber cushion Br.

As a result of the above configuration of the dust boot 1, the small diameter parts 4 of the bellows 2 in the first section M and the second section L have inner diameters that gradually decrease in the downward direction. Even when the piston rod R contracts to the maximum contracted position, the bellows 2 accumulated on the outside of the bump stopper 8 does not interfere with the rim of the upper end face C1 and prevents wear of the inner circumferential surface of the bellows 2 due to interference with the rim of the upper end C1.

With respect to the large diameter parts 3 of the bellows 2, the outer diameter of the large diameter parts 3 in the second section L is set to decrease in the downward direction. As can be seen from FIG. 1, the suspension spring SP has a decreased diameter part SP1 which starts to decrease in coil diameter from the middle of the suspension spring SP in the downward direction towards the lower spring seat SS2. Decreasing the outer diameter of the large diameter parts 3 in the second section L is especially preferable in view of preventing the bellows 2 from interfering with the decreased diameter part SP1 of the suspension spring SP.

The outer diameter of the large diameter parts 3 in the third section H and the first section M is set to be constant as illustrated by the broken line A in FIG. 3.

According to the configuration of the dust boot 1 described above, the bellows 2 in the second section L can be made slim while preventing wear of the inner circumferential surface of the bellows 2 due to interference with the upper end face C1 of the projecting portion.

It is also possible to prevent the inner circumferential surface of the bellows 2 from interfering with the upper end face C1 of the projecting portion even when the inner diameter of small diameter parts 4 in the first section M is set to be constant. However, as a result, the length of the tapered face 9 in the vicinity of the boundary between the second section L and the first section M tends to be long and a moment acting on this tapered face 9 tends to be large. By gradually decreasing the inner diameter of the small diameter parts 4 in the first section M in the downward direction, it is possible to shorten the length of the tapered face 9 in the vicinity of the boundary, and hence a fatigue of a specific component of the bellows 2 due to a concentration of stress can be prevented.

In a shock absorber for a vehicle, when the dust boot interferes with the upper end face of the projecting portion while the vehicle is running, a rubbing noise or a knocking noise may be generated, making the passengers feel uncomfortable. However, by using the dust boot 1 configured above for a shock absorber for a vehicle, the generation of such an unpleasant rubbing noise or knocking noise can be prevented.

In the dust boot 1, the diameters of the small diameter parts 4 and the large diameter parts 3 of the bellows 2 vary respectively, and hence the intervals between the small diameter parts 4 and the large diameter parts 3, or in other words, the length of the tapered faces 9, is not constant. The length of the tapered face 9 in the first section M is set to be greater than the length of the tapered face 9 in the second and third sections L, H. To explain in further detail, the length of the tapered faces 9 increases from the lower end 8 in the upward direction, reaches a maximum in the middle of the first section M, decreases thereafter, and continues to decrease towards the third section H. The length of the tapered faces 9 in the third section H is set to a constant small value.

By thus setting the length of the tapered faces 9, an ample stroke length of the bellows 2 is ensured.

It should be noted however that the length of the tapered faces 9 does not necessarily vary gradually, and it may be varied in a stepwise fashion depending on the groups of the tapered faces 9.

Figure 4:
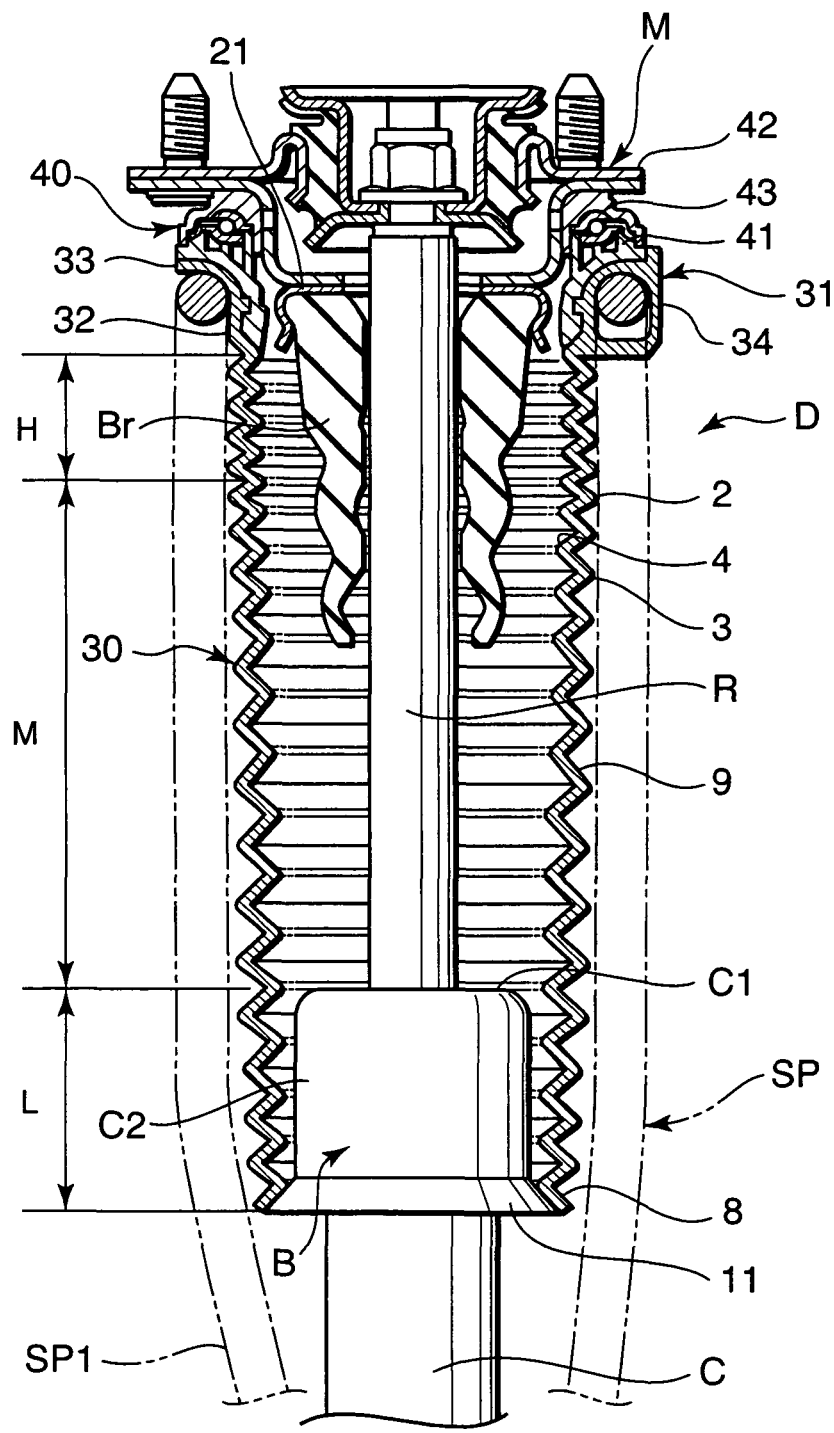
FIG. 4 is a longitudinal sectional view of essential parts of a hydraulic shock absorber in a maximum elongated position, provided with a dust boot according to a further embodiment of this invention.

Referring to FIG. 4 next, a further embodiment of this invention will be described.

According to this embodiment, the hydraulic shock absorber D comprises a dust boot 30 instead of the dust boot 1 of the first embodiment. The dust boot 30 is provided with an upper spring seat 31 which supports the upper end of the suspension spring SP, instead of the cylindrical part 6 of the dust boot 1. The bellows 2 extends from the lower end of the upper spring seat 31. The upper spring seat 31 is formed from a resin and integrated with the bellows 2.

The upper spring seat 31 comprises an annular portion 32, a flange portion 33 supporting the upper end of the suspension spring SP, and a hook portion 34 which holds an end of the suspension spring SP to prevent the suspension spring SP from detaching from the flange portion 33. According to this construction, the upper end of the upper spring seat 31 always displaces together with the piston rod R.

The dust boot 30 is connected to the piston rod R via a retainer 40 fitted into the annular part 32.

The retainer 40 comprises a fitting part 41 fitted into the interior of the annular part 32, and a support 42 supporting the fitting part 41. The support 42 is fixed to the piston rod R via a mount M and supports the fitting part 41. A ball bearing 43 is interposed between the support 42 and the fitting part 41 such that the upper spring seat 31 can gyrate with respect to the retainer 40. Owing to the above construction of the retainer 40, the upper spring seat 31 is supported by the piston rod R in a state where it can rotate relatively with respect to the piston rod R.

The other components of the dust boot 30 are identical to those of the dust boot 1 of the first embodiment.

This embodiment has a specific effect in addition to the effect brought about by the dust boot 1 of the first embodiment, Since the dust boot 30 is integrated with the upper spring seat 31 in this embodiment, positioning of the bellows 2 of the dust boot 30 with respect to the suspension spring SP in the radial direction is performed implicitly. Interference between the bellows 2 and the suspension spring SP is therefore prevented without failure. Fitting of the dust boot 30 onto the shock absorber D is also easy.

The upper spring seat 31 formed from a resin contributes to a reduction of the weight of the shock absorber D.

In the first embodiment, the dust boot 1 is secured to the piston rod R by pressing an annular area around the through hole 7 of the cylindrical part 6 against the tapered portion 22 of the piston rod R via the washer 23. In this embodiment, the dust boot 30 is connected to the piston rod R via the retainer 40 which has a greater diameter than the washer 23, and hence the supporting structure of the dust boot 30 is more stable than that of the dust boot 1 of the first embodiment.

The dust boots 1 and 30 have been explained on the assumption that they are applied to a shock absorber for a vehicle. However, the dust boots 1 and 30 according to this invention can be applied to any kind of devices having a piston rod projecting from a cylinder.

The contents of Tokugan 2006-35170, with a filing date of Feb. 13, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

1. A dust boot covering at least a part of a piston rod projecting from a cylinder or a cylinder fixed member, comprising:

a cylindrical bellows comprising crest parts and groove parts which are disposed alternately;

wherein,
an end of the bellows is supported by a support fixed to an outer surface of the cylinder;
the cylinder or the cylinder fixed member comprises a projecting portion as a part which is fixed to the cylinder or the cylinder fixed member and projects into the bellows;
the bellows is divided into several sections in the direction of projection of the piston rod, the several sections including a first section which comprises a plurality of some of the crest parts and the groove parts and passes a projecting end of the projecting portion without contacting when the piston rod elongates and contracts with respect to the cylinder, and a second section located between the first section and the support and comprising a plurality of other ones of the crest parts and the groove parts;
the inner diameter of all the groove parts in the second section is set to be smaller than the inner diameter of a groove part located at a boundary between the first section and the second section; and
the inner diameter of the groove parts in the first section gradually increases as a distance from the second section along the piston rod increases.

2. The dust boot as defined in claim 1, wherein the inner diameter of the groove parts in the second section gradually decreases towards the support.

3. The dust boot as defined in claim 1, wherein an outer diameter of the crest parts in the first section is constant.

4. The dust boot as defined in claim 1, wherein a crest part and a groove part adjacent thereto are connected by a tapered face, and the tapered faces in the first section are greater than the tapered faces in the other sections.

5. The dust boot as defined in claim 1, wherein the bellows comprises a cylindrical part with a bottom which is continuous with another end of the bellows, and the piston rod penetrates the bottom of the cylindrical part.

6. The dust boot as defined in claim 5, wherein the dust boot is disposed inside a coil spring which is disposed between the cylinder and the piston rod, and the cylindrical part is fixed to the piston rod together with a spring seat supporting the coil spring on the piston rod.

7. The dust boot as defined in claim 1, wherein the dust boot is disposed inside a coil spring which is disposed between the cylinder and the piston rod, and another end of the bellows is supported by a spring seat which supports the coil spring on the piston rod.

8. The dust boot as defined in claim 6, wherein the coil spring is supported by a second spring seat provided on the outer circumference of the cylinder and comprises a decreased diameter part on the outside of the cylinder which decreases in diameter towards the second spring seat, and the outer diameter of the crest parts of the bellows in the second section is smaller than the outer diameter of the crest parts in the other sections.

9. The dust boot as defined in claim 1, wherein the cylinder fixed member comprises a bump stopper which is fixed to an end of the cylinder and prevents the piston rod from contracting beyond a predetermined position by coming into contact with a rubber cushion which is fixed to the projecting end of the piston rod.

10. A dust boot covering at least a part of a piston rod projecting from a cylinder or a cylinder fixed member, comprising:
a cylindrical bellows comprising crest parts and groove parts which are disposed alternately;
wherein,
a bump stopper is fitted to the cylinder, and projects into the bellows;
an end of the bellows is supported by a support that is formed in a lower end of the bump stopper;
the bellows is divided into several sections in the direction of projection of the piston rod, the several sections including a first section which comprises a plurality of some of the crest parts and the groove parts and passes a projecting end of the projecting portion without contacting when the piston rod elongates and contracts with respect to the cylinder, and a second section located between the first section and the support and comprising a plurality of other ones of the crest parts and the groove parts;
the inner diameter of all the groove parts in the second section is set to be smaller than the inner diameter of a groove part located at a boundary between the first section and the second section; and
the bump stopper prevents the piston rod from contracting beyond a predetermined position by coming into contact with a rubber cushion which is fixed to the piston rod, the bump stopper being fixed to an end of the cylinder adjacent to the second section of the bellows.

11. The dust boot as defined in claim 10, wherein a lower end of the bellows is formed as a tapered face, and the support is formed in a conical shape which matches the tapered face forming the lower end of the bellow.

12. A dust boot covering at least a part of a piston rod projecting from a cylinder or a cylinder fixed member, comprising:
a cylindrical bellows comprising crest parts and groove parts which are disposed alternately;
wherein,
an end of the bellows is supported by a support fixed to an outer surface of the cylinder;
the cylinder fixed member comprises a projecting portion which is fixed to an upper end of the cylinder, such that the projecting portion projects upward from the upper end of the cylinder into the bellows;
the bellows is divided into several sections in the direction of projection of the piston rod, the several sections including a first section which comprises a plurality of some of the crest parts and the groove parts and passes a projecting end of the projecting portion without contacting when the piston rod elongates and contracts with respect to the cylinder, and a second section located between the first section and the support and comprising a plurality of other ones of the crest parts and the groove parts;
the inner diameter of all the groove parts in the second section is set to be smaller than the inner diameter of a groove part located at a boundary between the first section and the second section; and
the inner diameter of the groove parts in the first section gradually increases as a distance from the second section along the piston rod increases.

* * * * *